(12) United States Patent
Sakazaki et al.

(10) Patent No.: US 11,181,153 B2
(45) Date of Patent: Nov. 23, 2021

(54) CLUTCH DEVICE

(71) Applicant: JTEKT CORPORATION, Osaka (JP)

(72) Inventors: Koudai Sakazaki, Kariya (JP); Noriyuki Fujii, Hekinan (JP)

(73) Assignee: JTEKT CORPORATION, Osaka (JP)

( * ) Notice: Subject to any disclaimer, the term of this patent is extended or adjusted under 35 U.S.C. 154(b) by 86 days.

(21) Appl. No.: 16/701,229

(22) Filed: Dec. 3, 2019

(65) Prior Publication Data

US 2020/0182293 A1 Jun. 11, 2020

(30) Foreign Application Priority Data

Dec. 11, 2018 (JP) .............................. JP2018-231950

(51) Int. Cl.
  *F16D 21/00* (2006.01)
  *F16D 13/52* (2006.01)
  (Continued)

(52) U.S. Cl.
  CPC ............ *F16D 21/00* (2013.01); *F16D 13/52* (2013.01); *F16D 13/74* (2013.01); *B60K 17/02* (2013.01); *B60K 17/34* (2013.01); *F16C 19/364* (2013.01)

(58) Field of Classification Search
  CPC ............ F16C 19/364; F16C 2326/01; F16C 33/6659; F16C 19/548; F16C 19/54; F16D 13/52; F16D 13/74; F16D 21/00; F16D 2021/0607; F16D 25/10; F16D 2021/0692; F16D 2021/0661; F16D 25/123; F16D 25/082; B60K 17/02; B60K 17/34; B60K 2023/043; B60K 2001/001; B60K 17/356; B60K 1/00; B60K 17/354; F16H 2057/0216; F16H 57/0037; F16H 57/043; F16H 57/0426; F16H 57/0457; F16H 57/0495; F16H 57/0424; F16H 57/0473
  See application file for complete search history.

(56) References Cited

U.S. PATENT DOCUMENTS

2014/0284168 A1\* 9/2014 Niwata ................ F16D 25/083
  192/85.61
2017/0210315 A1\* 7/2017 Nakajima ................ B60K 6/26
  (Continued)

FOREIGN PATENT DOCUMENTS

DE    102017104446    \*  9/2018
WO    WO 2017/157479 A1    9/2017

*Primary Examiner* — Mark A Manley
(74) *Attorney, Agent, or Firm* — Oblon, McClelland, Maier & Neustadt, L.L.P.

(57) ABSTRACT

A clutch device includes a case, a clutch housing, a multi-disc clutch, and a rolling bearing. The clutch housing is housed in the case. The clutch housing includes a cylindrical portion including a housing space defined in the cylindrical portion, and a wall extending radially inward from an end of the cylindrical portion. The multi-disc clutch is housed in the housing space and includes a plurality of clutch plates. The rolling bearing includes an inner ring, an outer ring, and a plurality of rolling elements disposed between the inner and outer rings. The inner ring of the rolling bearing is attached to an inner ring attachment portion of the case. The outer ring of the rolling bearing is attached to an outer ring attachment portion of the wall of the clutch housing. The rolling bearing supports the clutch housing such that the clutch housing is rotatable relative to the case.

10 Claims, 7 Drawing Sheets

(51) Int. Cl.
   *F16D 13/74*   (2006.01)
   *F16C 19/36*   (2006.01)
   *B60K 17/02*   (2006.01)
   *B60K 17/34*   (2006.01)

(56) References Cited

U.S. PATENT DOCUMENTS

2018/0087486 A1\* 3/2018 Engrand ............... F03C 1/0472
2018/0163839 A1\* 6/2018 Niwata ................ F16H 57/038
2018/0245640 A1\* 8/2018 Lorenz .................. B60K 6/387
2019/0337505 A1\* 11/2019 Haupt .................. B60W 10/10

\* cited by examiner

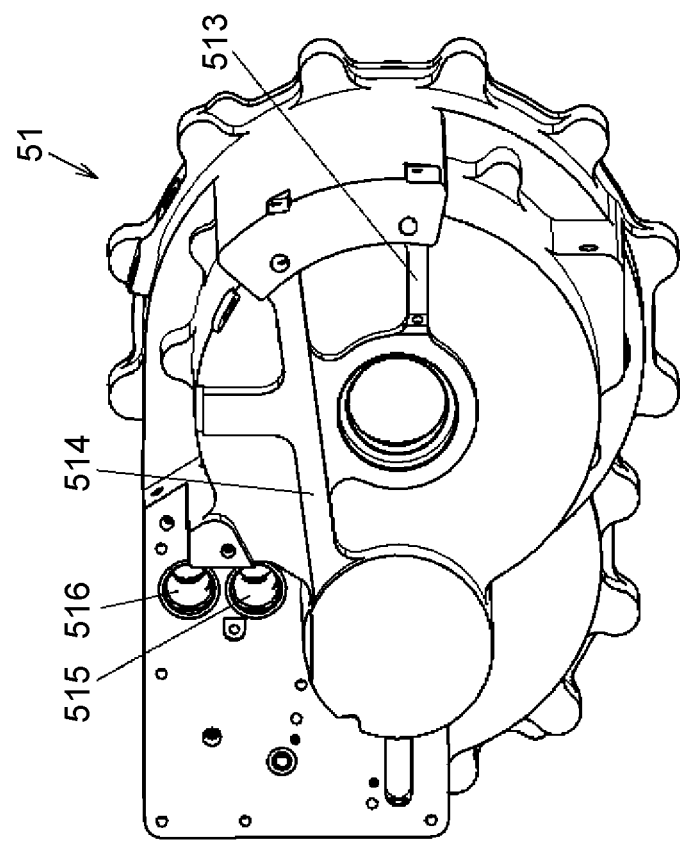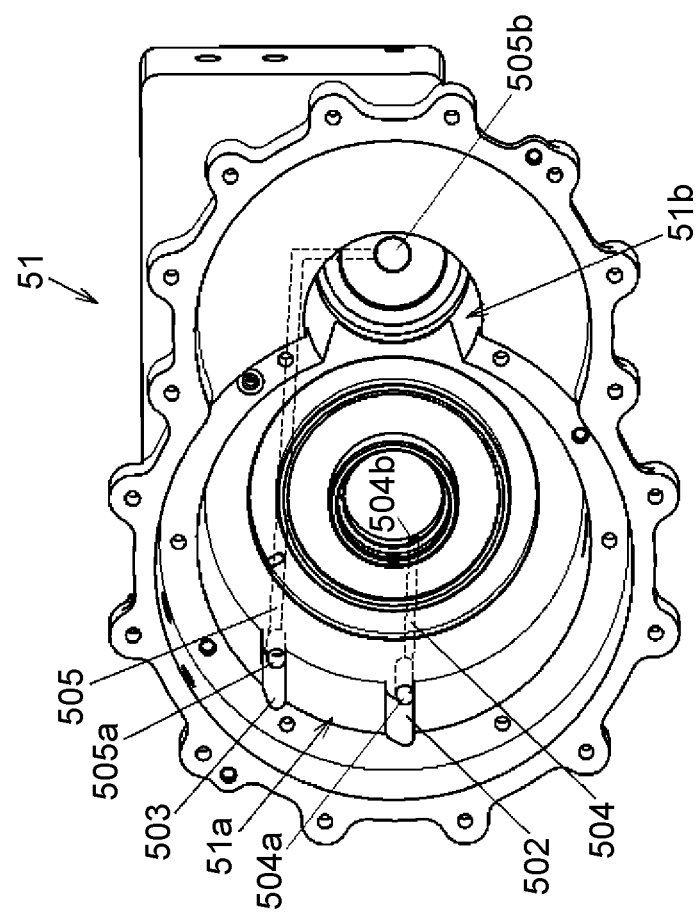

CLUTCH DEVICE

INCORPORATION BY REFERENCE

The disclosure of Japanese Patent Application No. 2018-231950 filed on Dec. 11, 2018 including the specification, drawings and abstract is incorporated herein by reference in its entirety.

BACKGROUND

1. Technical Field

The present disclosure relates to clutch device including a plurality of clutch plates housed in a clutch housing.

2. Description of the Related Art

A clutch device including a plurality of clutch plates housed in a clutch housing is used, for example, in a driving apparatus for auxiliary driving wheels of a four-wheel-drive vehicle (see, for example, WO 2017/157479).

The clutch device disclosed in WO 2017/157479 includes: a first multi-disc clutch to transmit a driving force to one of right and left wheels of a vehicle; a second multi-disc clutch to transmit a driving force to the other one of the right and left wheels; and a clutch housing that houses the first and second multi-disc clutches. The clutch housing includes: an outer shell surrounding the outer peripheries of the first and second multi-disc clutches; a pair of walls axially sandwiching the first and second multi-disc clutches; and a pair of cylindrical sleeves axially extending from inner diameter ends of the walls. The sleeves are inserted through inner rings of a pair of tapered roller bearings and thus supported such that the sleeves are rotatable relative to a casing.

SUMMARY

Growing environmental awareness in recent years is creating a need for smaller and lighter clutch devices for use in vehicles, for example. The inventors have re-examined a clutch housing that houses a multi-disc clutch and a support structure for the clutch housing, and have found a way to reduce the size and weight of a clutch device. This has led the inventors to come up with the present disclosure. The present disclosure provides a smaller and lighter clutch device.

A clutch device according to a first aspect of the present disclosure includes a case, a clutch housing, a multi-disc clutch, and a rolling bearing. The clutch housing is housed in the case. The clutch housing includes a cylindrical portion and a wall. The cylindrical portion includes a housing space defined inside the cylindrical portion. The wall extends radially inward from an end of the cylindrical portion. The multi-disc clutch is housed in the housing space. The multi-disc clutch includes a plurality of clutch plates. The rolling bearing includes an inner ring, an outer ring, and a plurality of rolling elements disposed between the inner ring and the outer ring. The inner ring of the rolling bearing is attached to an inner ring attachment portion of the case. The outer ring of the rolling bearing is attached to an outer ring attachment portion of the wall of the clutch housing. The rolling bearing is configured to support the clutch housing such that the clutch housing is rotatable relative to the case.

The clutch device according to the first aspect of the present disclosure may further include an inner rotative member disposed inward of the clutch housing. The rolling bearing may be a tapered roller bearing in which the rolling elements each include a large diameter portion and a small diameter portion such that each of the rolling elements has a conical shape. The rolling elements may roll on an outer ring raceway surface of an inner peripheral surface of the outer ring and an inner ring raceway surface of an outer peripheral surface of the inner ring. The large diameter portion of the each rolling element of the rolling bearing may be disposed farther away from the housing space than the small diameter portion of the each rolling element in an axial direction parallel to a rotation axis of the inner rotative member.

The clutch device according to the first aspect of the present disclosure may further include an inner rotative member disposed inward of the clutch housing, and a support member to support the inner rotative member such that the inner rotative member rotates relative to the case. The multi-disc clutch may include a plurality of outer clutch plates in engagement with the cylindrical portion of the clutch housing such that the outer clutch plates are non-rotatable relative to the cylindrical portion, and a plurality of inner clutch plates in engagement with the inner rotative member such that the inner clutch plates are non-rotatable relative to the inner rotative member. The support member may be disposed radially inward of the inner ring of the rolling bearing.

The clutch device according to the first aspect of the present disclosure may further include a lubricating structure configured to supply lubricating oil to the rolling bearing supporting the clutch housing. The support member may be a rolling bearing including an inner ring, an outer ring, and a plurality of rolling elements disposed in a bearing inner space defined between the inner ring and the outer ring. The lubricating structure may be configured to supply the lubricating oil having passed through the bearing inner space.

The clutch device according to the first aspect of the present disclosure may further include a lubricating structure configured to supply lubricating oil to the rolling bearing supporting the clutch housing. The inner rotative member may include a groove defined in a portion of an outer peripheral surface of the inner rotative member located radially inward of the support member. The groove may be configured to allow the lubricating oil to flow through the groove. The lubricating structure may be configured such that the lubricating oil having flowed through the groove is supplied to the rolling bearing supporting the clutch housing.

The clutch device according to the first aspect of the present disclosure may further include a lubricating structure configured to supply lubricating oil to the rolling bearing supporting the clutch housing. The inner ring of the rolling bearing supporting the clutch housing may be disposed on an outer periphery of a projection of the case. The projection may include a groove defined in a portion of an inner peripheral surface of the projection located radially outward of the support member. The groove may be configured to allow the lubricating oil to flow through the groove. The lubricating structure may be configured such that the lubricating oil having flowed through the groove is supplied to the rolling bearing supporting the clutch housing.

The support member of the clutch device according to the first aspect of the present disclosure may be prevented from moving to one side in an axial direction parallel to a rotation axis of the inner rotative member by a snap ring fitted to the projection. At least a portion of the groove of the projection located radially outward of the snap ring may reach an outer peripheral surface of the projection.

The inner rotative member of the clutch device according to the first aspect of the present disclosure may include an engagement portion in engagement with the inner clutch plates. The inner rotative member may be provided with an introduction space into which the lubricating oil having passed through the bearing inner space is introduced. The introduction space may be located inward of the engagement portion. The inner rotative member may be provided with an oil hole through which the introduction space is in communication with the housing space. The lubricating structure may be configured such that the lubricating oil introduced into the introduction space is supplied to the multi-disc clutch through the oil hole.

A clutch device according to a second aspect of the present disclosure includes a case, a first clutch housing, a second clutch housing, a first multi-disc clutch, a second multi-disc clutch, a partition, a first rolling bearing, and a second rolling bearing. The first and second clutch housings are housed in the case. The first and second multi-disc clutches each include a plurality of clutch plates. The first rolling bearing supports the first clutch housing such that the first clutch housing is rotatable relative to the case. The second rolling bearing supports the second clutch housing such that the second clutch housing is rotatable relative to the case. The first and second clutch housings each include a cylindrical portion and a wall extending inward from an end of the cylindrical portion. The first multi-disc clutch is housed in a first housing space defined inward of the cylindrical portion of the first clutch housing. The second multi-disc clutch is housed in a second housing space defined inward of the cylindrical portion of the second clutch housing. The partition defines a boundary between the first housing space and the second housing space. The first rolling bearing includes an inner ring, an outer ring, and a plurality of rolling elements disposed between the inner ring and the outer ring. The inner ring of the first rolling bearing is attached to a first inner ring attachment portion of the case. The outer ring of the first rolling bearing is attached to a first outer ring attachment portion of the wall of the first clutch housing. The second rolling bearing includes an inner ring, an outer ring, and a plurality of rolling elements disposed between the inner ring and the outer ring. The inner ring of the second rolling bearing is attached to a second inner ring attachment portion of the case. The outer ring of the second rolling bearing is attached to a second outer ring attachment portion of the wall of the second clutch housing.

The clutch device according to the second aspect of the present disclosure may further include a first presser, a second presser, a first inner rotative member, and a second inner rotative member. The first inner rotative member may be disposed inward of the first clutch housing. The second inner rotative member may be disposed inward of the second clutch housing. The walls of the first and second clutch housings may each be provided with a through hole extending in an axial direction parallel to a rotation axis of the first and second inner rotative members. The first presser may include a pressing portion inserted through the through hole of the wall of the first clutch housing. The first presser may be configured to press the first multi-disc clutch to the partition. The second presser may include a pressing portion inserted through the through hole of the wall of the second clutch housing. The second presser may be configured to press the second multi-disc clutch to the partition.

The partition of the clutch device according to the second aspect of the present disclosure may be secured to the first and second clutch housings such that the partition is immovable relative to the first and second clutch housings in the axial direction.

The present disclosure provides a smaller and lighter clutch device.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 5A is a perspective view of a first case as viewed from the driver;

FIG. 5B is a perspective view of the first case as viewed from a position opposite to the driver;

DETAILED DESCRIPTION OF EMBODIMENTS

Embodiment

An embodiment of the present disclosure will be described with reference to FIGS. 1 to 5B. The embodiment described below illustrates preferable specific examples to carry out the present disclosure. Although the embodiment described below specifically illustrates various preferred technical features in part, the technical scope of the present disclosure is not limited to these technical features.

Figure 1:
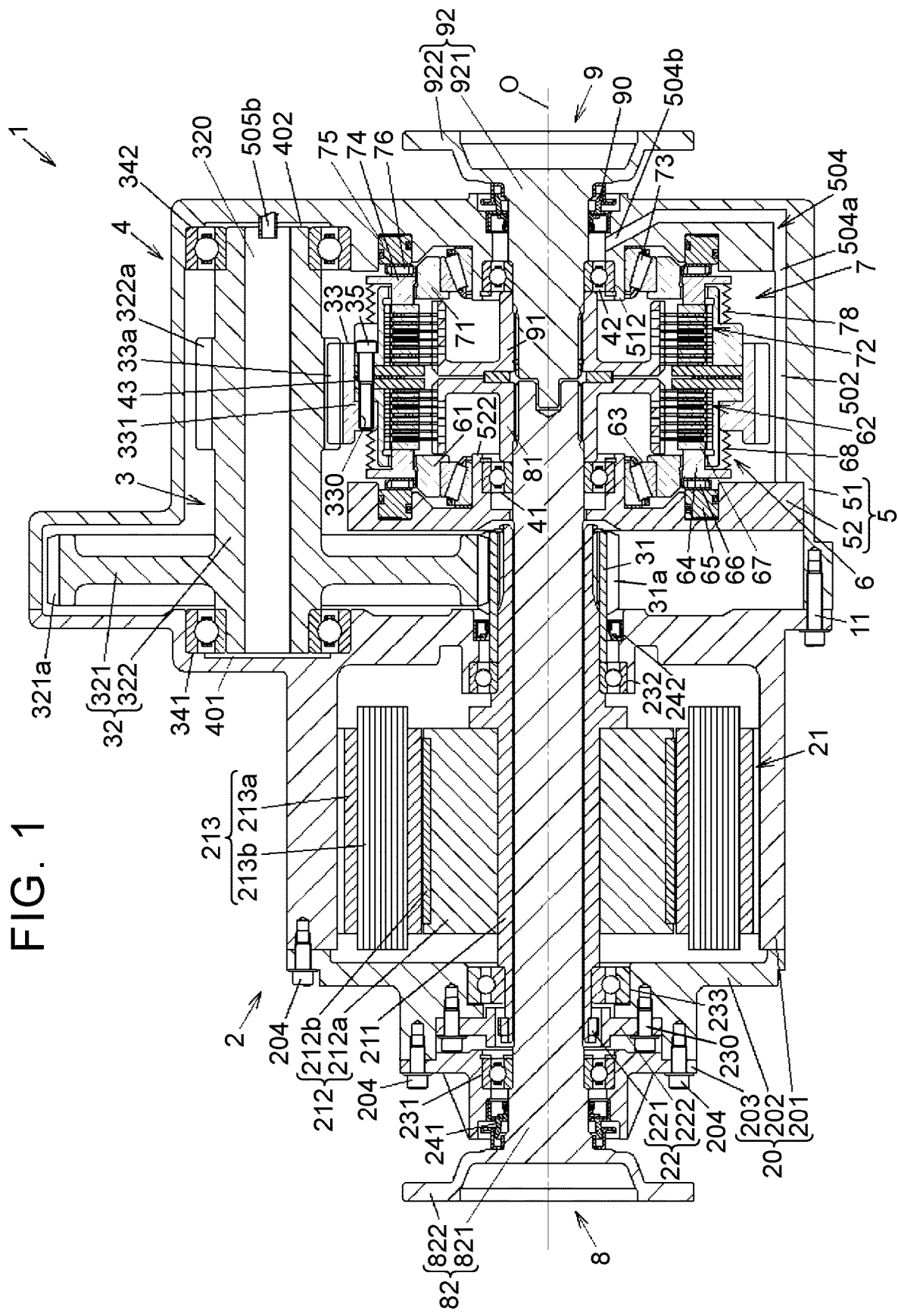
FIG. 1 is a cross-sectional view of an exemplary structure of a vehicle driving apparatus including a clutch device according to an embodiment of the present disclosure.
Figure 2:
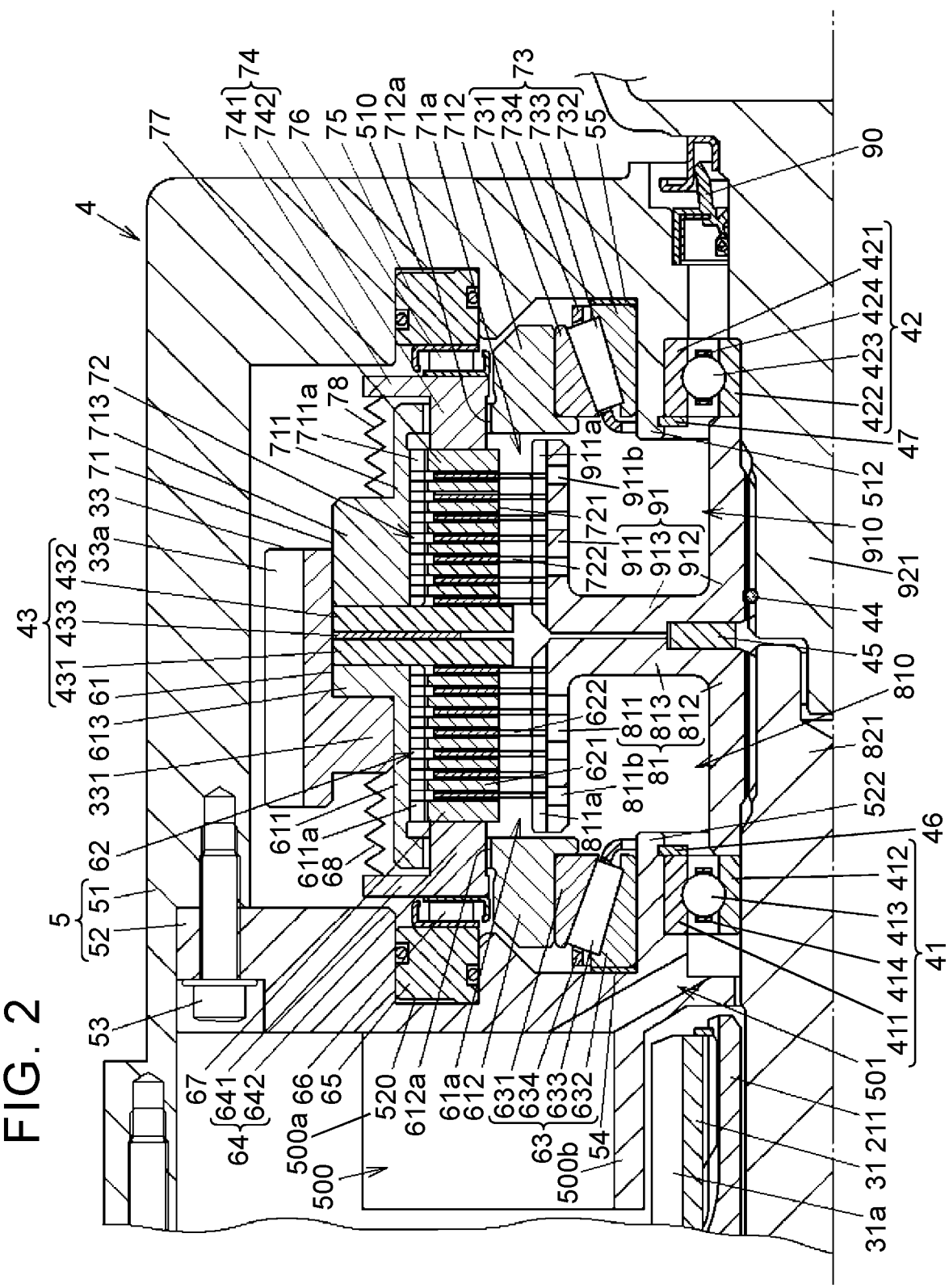
FIG. 2 is an enlarged cross-sectional view of a portion of the vehicle driving apparatus.

FIG. 1 is a cross-sectional view of an exemplary structure of a vehicle driving apparatus 1 including a clutch device according to the embodiment of the present disclosure. FIG. 2 is an enlarged cross-sectional view of a portion of the vehicle driving apparatus 1. FIG. 1 illustrates the vehicle driving apparatus 1 installed on a vehicle as viewed in horizontal cross section.

Overall Structure of Vehicle Driving Apparatus

The vehicle driving apparatus 1 is installed on a four-wheel-drive vehicle including right and left front wheels and right and left rear wheels. When the right and left front wheels function as main driving wheels, the right and left rear wheels function as auxiliary driving wheels. When the right and left rear wheels function as the main driving wheels, the right and left front wheels function as the auxiliary driving wheels. The vehicle driving apparatus 1 is used to drive the auxiliary driving wheels (e.g., the right and left rear wheels). The vehicle driving apparatus 1 is able to change a right and left driving force distribution ratio. As used herein, the term "right and left driving force distribution ratio" refers to a ratio between a driving force to be transmitted to the left wheel and a driving force to be transmitted to the right wheel. The main driving wheels are driven by a main driving source. The main driving source includes an engine (such as an internal combustion engine), a high power electric motor, or a hybrid system that is a combination of the engine and the high power electric motor. The vehicle driving apparatus 1 is able to enhance running stability during turning by adjusting the right and left driving force distribution ratio of the auxiliary driving wheels (e.g., by increasing the driving force to be transmitted to the outer wheel during turning).

The vehicle driving apparatus 1 includes a driver 2, a decelerator 3, and a clutch device 4. The driver 2 includes an electric motor 21. The electric motor 21 functions as an auxiliary driving source to drive the auxiliary driving wheels. The decelerator 3 decelerates output rotation of a rotation shaft 211 of the electric motor 21. The clutch device 4 distributes a driving force from the electric motor 21, decelerated by the decelerator 3, to the right and left wheels such that the driving force is transmitted to the right and left wheels.

The clutch device 4 includes a clutch case 5, a first clutch 6, a second clutch 7, a first inner rotative member 8, a second inner rotative member 9, a first support member 41, a second support member 42, and a partition 43. The clutch case 5 is a case. The first and second clutches 6 and 7 are housed in the clutch case 5. The driving force provided from the decelerator 3 is transmitted to the first inner rotative member 8 through the first clutch 6. The driving force provided from the decelerator 3 is transmitted to the second inner rotative member 9 through the second clutch 7. The first support member 41 supports the first inner rotative member 8 such that the first inner rotative member 8 is rotatable relative to the clutch case 5. The second support member 42 supports the second inner rotative member 9 such that the second inner rotative member 9 is rotatable relative to the clutch case 5. The partition 43 is disposed between the first clutch 6 and the second clutch 7.

The first inner rotative member 8 includes a first clutch hub 81 and a first output shaft 82. The first clutch hub 81 and the first output shaft 82 are spline-fitted to each other and thus rotate together. The first output shaft 82 includes a body 821 and a flange 822. A drive shaft that transmits a driving force to the left wheel is coupled to the flange 822 of the first output shaft 82. As illustrated in FIG. 2, the first clutch hub 81 includes an outer cylindrical portion 811, an inner cylindrical portion 812, and an annular wall 813. The annular wall 813 is provided between the outer cylindrical portion 811 and the inner cylindrical portion 812. The inner cylindrical portion 812 is coupled to an end of the body 821 of the first output shaft 82. The first clutch hub 81 and the first output shaft 82 may be integral with each other.

A space defined between the outer cylindrical portion 811 and the inner cylindrical portion 812 serves as an introduction space 810 into which lubricating oil is introduced from a first oil passage 501 (which will be described below). The outer cylindrical portion 811 is provided with a plurality of oil holes 811*b* radially passing through the outer cylindrical portion 811. The lubricating oil introduced into the introduction space 810 is supplied to a first multi-disc clutch 62 through the oil holes 811*b*. The oil holes 811*b* are in communication with the introduction space 810 and a housing space 61*a* in which the first multi-disc clutch 62 is housed.

The second inner rotative member 9 includes a second clutch hub 91 and a second output shaft 92. The second clutch hub 91 and the second output shaft 92 are spline-fitted to each other and thus rotate together. The second output shaft 92 includes a body 921 and a flange 922. A drive shaft that transmits a driving force to the right wheel is coupled to the flange 922 of the second output shaft 92. As illustrated in FIG. 2, the second clutch hub 91 includes an outer cylindrical portion 911, an inner cylindrical portion 912, and an annular wall 913. The annular wall 913 is provided between the outer cylindrical portion 911 and the inner cylindrical portion 912. The inner cylindrical portion 912 is coupled to an end of the body 921 of the second output shaft 92. The second clutch hub 91 and the second output shaft 92 may be integral with each other.

A space defined between the outer cylindrical portion 911 and the inner cylindrical portion 912 and closer to a first case member 51 than the annular wall 913 serves as an introduction space 910 into which lubricating oil is introduced from a second oil passage 504 (which will be described below). The outer cylindrical portion 911 is provided with a plurality of oil holes 911*b* radially passing through the outer cylindrical portion 911. The lubricating oil introduced into the introduction space 910 is supplied to a second multi-disc clutch 72 through the oil holes 911*b*. The oil holes 911*b* are in communication with the introduction space 910 and a housing space 71*a* in which the second multi-disc clutch 72 is housed.

The first and second inner rotative members 8 and 9 rotate relative to each other around a rotation axis O extending in a vehicle width direction. As used herein, the term "axial", "axially", or "axial direction" refers to a direction parallel to the rotation axis O. Relative axial movement of the second clutch hub 91 and the second output shaft 92 is prevented by a snap ring 44. A sliding bearing 45 is disposed between the annular wall 813 of the first clutch hub 81 and the annular wall 913 of the second clutch hub 91.

The driver 2 includes a motor case 20, the electric motor 21, and a rotation sensor 22. The rotation sensor 22 detects rotation of the rotation shaft 211 of the electric motor 21. The motor case 20 includes a first case member 201, a second case member 202, and a third case member 203. The first to third case members 201 to 203 are fastened to each other with a plurality of bolts 204. The rotation sensor 22 includes a resolver rotor 221 and a resolver sensor 222. The resolver rotor 221 is secured to the rotation shaft 211. The resolver sensor 222 is secured to the second case member 202 with a bolt 230. A ball bearing 231 and a seal 241 are disposed between the third case member 203 and the body 821 of the first output shaft 82.

The electric motor 21 is a three-phase brushless motor. The electric motor 21 includes a rotor 212 and a stator 213. The rotor 212 rotates together with the rotation shaft 211.

The stator 213 is secured to the first case member 201. The rotor 212 includes a rotor core 212a and a plurality of permanent magnets 212b. The permanent magnets 212b are secured to the outer peripheral surface of the rotor core 212a. The stator 213 includes a stator core 213a and a plurality of coils 213b. The coils 213b are wound around the stator core 213a. A controller (not illustrated) supplies a motor current to the coils 213b. The motor current is responsive to the rotational position of the rotation shaft 211 detected by the rotation sensor 22.

The rotation shaft 211 of the electric motor 21 has a hollow tubular shape. The rotation shaft 211 is supported by ball bearings 232 and 233 such that the rotation shaft 211 is rotatable relative to the motor case 20. The body 821 of the first output shaft 82 is inserted through the central portion of the rotation shaft 211. The ball bearing 232 is fitted and secured to the first case member 201. The ball bearing 233 is fitted and secured to the second case member 202.

The decelerator 3 includes a tubular pinion gear 31, a reduction gear 32, and a ring gear 33. The pinion gear 31 is externally fitted to an end of the rotation shaft 211 of the electric motor 21. The pinion gear 31 is spline-fitted to the rotation shaft 211 and thus rotates together with the rotation shaft 211. The reduction gear 32 includes a disk 321 and a hollow shaft 322. The disk 321 and the hollow shaft 322 are integral with each other. The outer peripheral end of the disk 321 is provided with a large diameter gear 321a. The outer periphery of the pinion gear 31 is provided with a gear 31a. The large diameter gear 321a of the disk 321 is in mesh with the gear 31a.

An axial hole 320 is defined in the central portion of the hollow shaft 322. The axial hole 320 passes through the central portion of the hollow shaft 322. The outer periphery of an axial portion of the hollow shaft 322 is provided with a small diameter gear 322a. The outer periphery of the ring gear 33 is provided with a gear 33a. The small diameter gear 322a is in mesh with the gear 33a. The ring gear 33 is provided with an annular inward protrusion 331. The protrusion 331 is provided with a plurality of threaded holes 330 into which fastening bolts 35 are screwed.

The clutch case 5 of the clutch device 4 houses the first and second clutches 6 and 7 and the decelerator 3. The clutch case 5 includes the first case member 51 and a second case member 52. The first case member 51 is a bottomed tubular body open to its axial one side. The second case member 52 is a lid that closes a portion of the opening of the first case member 51. The first and second case members 51 and 52 are fastened to each other with a plurality of bolts 53. One of the bolts 53 is illustrated in FIG. 2. The first case member 51 and the first case member 201 of the motor case 20 are fastened to each other with a plurality of bolts 11.

The first support member 41 is disposed between the second case member 52 and the body 821 of the first output shaft 82. The first support member 41 supports the first inner rotative member 8 such that the first inner rotative member 8 is rotatable relative to the clutch case 5. The second support member 42 and a seal 90 are disposed between the first case member 51 and the body 921 of the second output shaft 92. The second support member 42 supports the second inner rotative member 9 such that the second inner rotative member 9 is rotatable relative to the clutch case 5. In the present embodiment, the first and second support members 41 and 42 are rolling bearings. More specifically, the first and second support members 41 and 42 are ball bearings.

The first and second support members 41 and 42 are not limited to ball bearings but may be, for example, cylindrical roller bearings. Because ball bearings are able to prevent axial movement of the first and second inner rotative members 8 and 9 relative to the clutch case 5, ball bearings are preferably used as the first and second support members 41 and 42. The first support member 41 will hereinafter be referred to as a "first ball bearing 41". The second support member 42 will hereinafter be referred to as a "second ball bearing 42".

Lubricating oil (not illustrated) is enclosed in the clutch case 5. The oil level of the lubricating oil when the electric motor 21 is not rotating is lower than the rotation axis O and corresponds to a position where at least a portion of the disk 321 of the reduction gear 32 is immersed in the lubricating oil. Leakage of the lubricating oil to the driver 2 is prevented by a seal 242 disposed between the first case member 201 of the motor case 20 and the pinion gear 31.

The hollow shaft 322 of the reduction gear 32 is supported by a ball bearing 341 and a ball bearing 342. The ball bearing 341 is fitted and secured to the first case member 201 of the motor case 20. The ball bearing 342 is fitted and secured to the first case member 51 of the clutch case 5. A clearance 401 is defined between one of the axial end faces of the hollow shaft 322 and the first case member 201 of the motor case 20. A clearance 402 is defined between the other axial end face of the hollow shaft 322 and the first case member 51 of the clutch case 5. The lubricating oil is able to flow through the clearances 401 and 402. The lubricating oil is introduced into the axial hole 320 of the hollow shaft 322 through a third oil passage 505 (which will be described below). The clearances 401 and 402 are in communication with the axial hole 320 of the hollow shaft 322.

The first clutch 6 includes a first clutch housing 61, the first multi-disc clutch 62, a first rolling bearing 63, a first presser 64, an annular piston 65, a thrust roller bearing 66, an annular pressing plate 67, and a return spring 68. The first multi-disc clutch 62 includes a plurality of outer clutch plates 621 and a plurality of inner clutch plates 622. The first rolling bearing 63 supports the first clutch housing 61 such that the first clutch housing 61 is rotatable relative to the clutch case 5. The first presser 64 axially presses the first multi-disc clutch 62. The piston 65 provides an axial moving force to the first presser 64 upon receiving oil pressure. The thrust roller bearing 66 is disposed between the first presser 64 and the piston 65. The pressing plate 67 is disposed between the first presser 64 and the first multi-disc clutch 62. The return spring 68 is an urger to urge the first presser 64 toward the piston 65. The first inner rotative member 8 is disposed inward of the first clutch housing 61.

As illustrated in FIG. 2, the first clutch housing 61 includes a cylindrical portion 611, a wall 612, and a flange 613. The wall 612 extends radially inward from a first end of the cylindrical portion 611. The flange 613 protrudes radially outward from a second end of the cylindrical portion 611. The cylindrical portion 611, the wall 612, and the flange 613 are integral with each other. The first clutch housing 61 is provided with a plurality of through holes 612a axially passing through the wall 612. The housing space 61a is defined inside the cylindrical portion 611. The first multi-disc clutch 62 is housed in the housing space 61a.

The inner peripheral surface of the cylindrical portion 611 is provided with a plurality of axially extending spline protrusions 611a. The outer peripheral ends of the outer clutch plates 621 are in engagement with the spline protrusions 611a of the cylindrical portion 611 of the first clutch housing 61. The outer clutch plates 621 are thus axially movable relative to the first clutch housing 61 but non-rotatable relative to the first clutch housing 61. In the present embodiment, the first multi-disc clutch 62 includes six outer clutch plates 621 and seven inner clutch plates 622 disposed alternately in the axial direction.

The inner clutch plates 622 are in engagement with a plurality of axially extending spline protrusions 811*a* provided on the outer peripheral surface of the outer cylindrical portion 811 of the first clutch hub 81. The inner clutch plates 622 are thus axially movable relative to the first clutch hub 81 but non-rotatable relative to the first clutch hub 81. The outer cylindrical portion 811 corresponds to an engagement portion according to the present disclosure. The inner clutch plates 622 are in engagement with the engagement portion.

In the present embodiment, the first rolling bearing 63 is a tapered roller bearing. The first rolling bearing 63 includes an outer ring 631, an inner ring 632, a plurality of tapered rollers 633, and a cage 634. The tapered rollers 633 are rolling elements disposed between the outer ring 631 and the inner ring 632. The cage 634 holds the tapered rollers 633. Alternatively, a ball bearing or a cylindrical roller bearing may be used as the first rolling bearing 63. A support structure for the first clutch housing 61, which is provided by the first rolling bearing 63, will be described in detail below. The first rolling bearing 63 will hereinafter be referred to as a "first tapered roller bearing 63".

The first presser 64 includes an annular plate base 641 and a plurality of pressing portions 642. The base 641 is larger in outside diameter than the cylindrical portion 611 of the first clutch housing 61. The pressing portions 642 axially protrude from the base 641. The return spring 68 is disposed on the outer periphery of the cylindrical portion 611 and in abutment with the base 641 of the first presser 64. The pressing portions 642 each have a cylindrical shape. The pressing portions 642 are inserted through the through holes 612*a* defined in the wall 612 of the first clutch housing 61. The first presser 64 is provided with, for example, six pressing portions 642 circumferentially disposed at regular intervals.

The second case member 52 is provided with a cylinder 520. Upon receiving the pressure of hydraulic oil supplied to the cylinder 520, the piston 65 provides an axial moving force to the first presser 64. The cylinder 520 receives hydraulic oil from the controller (not illustrated) through a pipe (not illustrated).

The second clutch 7 is disposed axially side by side with the first clutch 6 such that the first clutch 6 and the second clutch 7 are symmetrical. The second clutch 7 includes a second clutch housing 71, the second multi-disc clutch 72, a second tapered roller bearing (i.e., a second rolling bearing) 73, a second presser 74, a piston 75, a thrust roller bearing 76, an annular pressing plate 77, and a return spring 78. The second multi-disc clutch 72 includes a plurality of outer clutch plates 721 and a plurality of inner clutch plates 722. The second tapered roller bearing 73 supports the second clutch housing 71 such that the second clutch housing 71 is rotatable relative to the clutch case 5. The second presser 74 axially presses the second multi-disc clutch 72. The piston 75 provides an axial moving force to the second presser 74 upon receiving oil pressure. The thrust roller bearing 76 is disposed between the second presser 74 and the piston 75. The pressing plate 77 is disposed between the second presser 74 and the second multi-disc clutch 72. The return spring 78 is an urger to urge the second presser 74 toward the piston 75.

The second inner rotative member 9 is disposed inward of the second clutch housing 71. The first case member 51 is provided with a cylinder 510. Upon receiving the pressure of hydraulic oil supplied to the cylinder 510, the piston 75 provides an axial moving force to the second presser 74. The cylinder 510 receives hydraulic oil from the controller (not illustrated) through a pipe (not illustrated).

The components and portions of the second clutch 7 are similar to the components and portions of the first clutch 6. Thus, the components and portions of the second clutch 7 are identified by reference signs similar to those used for the components and portions of the first clutch 6, and detailed description of the components and portions of the second clutch 7 will be omitted when redundant. Specifically, the reference signs used for the components and portions of the second clutch 7 are similar to the reference signs used for the components and portions of the first clutch 6, except that the reference signs used for the components and portions of the first clutch 6 illustrated in FIGS. 1 and 2 begin with 6 and the reference signs used for the components and portions of the second clutch 7 illustrated in FIGS. 1 and 2 begin with 7.

The partition 43 includes a first end plate 431, a second end plate 432, and a spacer 433. The first end plate 431 is in abutment with the flange 613 of the first clutch housing 61. The second end plate 432 is in abutment with a flange 713 of the second clutch housing 71. The spacer 433 is disposed between the first end plate 431 and the second end plate 432. The partition 43 defines a boundary between the housing space 61*a* in which the first multi-disc clutch 62 is housed and the housing space 71*a* in which the second multi-disc clutch 72 is housed.

The fastening bolts 35 pass through the flange 613 of the first clutch housing 61, the flange 713 of the second clutch housing 71, the first end plate 431, the second end plate 432, and the spacer 433 and are screwed into the threaded holes 330 of the ring gear 33. This axially immovably secures the partition 43 to the first and second clutch housings 61 and 71. The first and second clutch housings 61 and 71 thus rotate together with the partition 43.

The first presser 64 presses the first multi-disc clutch 62 to the partition 43 so as to bring the outer clutch plates 621 and the inner clutch plates 622 into frictional contact with each other. This transmits a driving force between the first clutch housing 61 and the first clutch hub 81. The second presser 74 presses the second multi-disc clutch 72 to the partition 43 so as to bring the outer clutch plates 721 and the inner clutch plates 722 into frictional contact with each other. This transmits a driving force between the second clutch housing 71 and the second clutch hub 91. The inner clutch plates 722 are in engagement with a plurality of axially extending spline protrusions 911*a* provided on the outer peripheral surface of the outer cylindrical portion 911 of the second clutch hub 91.

Axial movement of the first clutch housing 61 is prevented by the first tapered roller bearing 63. Axial movement of the second clutch housing 71 is prevented by the second tapered roller bearing 73. A pressing force exerted by the first presser 64 is transmitted through the partition 43 to the second clutch housing 71 and received by the second tapered roller bearing 73. A pressing force exerted by the second presser 74 is transmitted through the partition 43 to the first clutch housing 61 and received by the first tapered roller bearing 63. This enables individual control of the driving force to be transmitted to the first inner rotative member 8 and the driving force to be transmitted to the second inner rotative member 9.

Figure 3A:
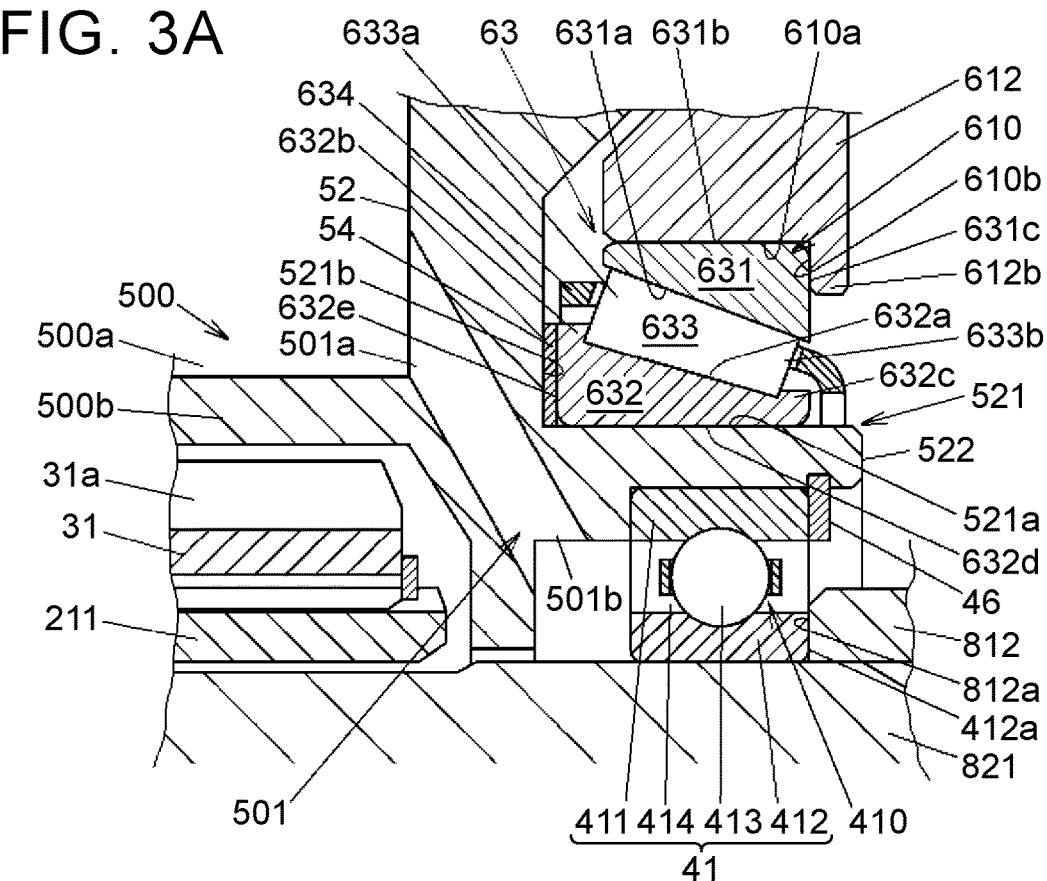
FIG. 3A is an enlarged cross-sectional view of a portion of FIG. 2 adjacent to a first tapered roller bearing.

FIG. 3A is an enlarged cross-sectional view of a portion of FIG. 2 adjacent to the first tapered roller bearing 63. The wall 612 of the first clutch housing 61 is provided with an outer ring attachment portion 610. The outer ring 631 of the first tapered roller bearing 63 is attached to the outer ring attachment portion 610. The second case member 52 of the clutch case 5 is provided with an inner ring attachment portion 521. The inner ring 632 of the first tapered roller bearing 63 is attached to the inner ring attachment portion 521. Each tapered roller 633 includes a large diameter portion 633a and a small diameter portion 633b and thus has a conical shape. The inner peripheral surface of the outer ring 631 is provided with an outer ring raceway surface 631a. The outer peripheral surface of the inner ring 632 is provided with an inner ring raceway surface 632a. The tapered rollers 633 roll on the outer ring raceway surface 631a and the inner ring raceway surface 632a. The inner ring 632 includes a bottom face rib 632b (hereinafter referred to as a "large rib 632b") and a top face rib 632c (hereinafter referred to as a "small rib 632c"). The large rib 632b and the small rib 632c prevent axial movement of the tapered rollers 633.

The outer ring attachment portion 610 is a recess defined in an inner diameter end of the wall 612. The outer ring attachment portion 610 includes an outer periphery receiving surface 610a and a lateral receiving surface 610b. The outer periphery receiving surface 610a is in contact with an outer peripheral surface 631b of the outer ring 631. The lateral receiving surface 610b is in contact with an axial end face 631c of the outer ring 631 located on its first axial side (i.e., adjacent to the small rib 632c of the inner ring 632). The lateral receiving surface 610b is provided in the form of a lateral surface of a protrusion 612b of the wall 612. The protrusion 612b protrudes radially inward from the outer periphery receiving surface 610a.

The second case member 52 is provided with a cylindrical projection 522. The inner ring attachment portion 521 is provided on the outer periphery of the projection 522. The inner ring attachment portion 521 includes an inner periphery receiving surface 521a and a lateral receiving surface 521b. The inner periphery receiving surface 521a is in contact with an inner peripheral surface 632d of the inner ring 632. A shim 54 is located between the lateral receiving surface 521b and an axial end face 632e of the inner ring 632 adjacent to the large rib 632b. The inner periphery receiving surface 521a is provided in the form of an outer peripheral surface of the projection 522.

The first ball bearing 41 includes an outer ring 411, an inner ring 412, a plurality of rolling elements 413, and a cage 414. The rolling elements 413 are disposed in a bearing inner space 410 defined between the outer ring 411 and the inner ring 412. The cage 414 holds the rolling elements 413. The outer ring 411 of the first ball bearing 41 is retained by a snap ring 46 fitted to the inner peripheral surface of the projection 522. The inner ring 412 of the first ball bearing 41 includes a lateral surface 412a. The lateral surface 412a of the inner ring 412 is in contact with an axial end face 812a of the inner cylindrical portion 812 of the first clutch hub 81.

The first ball bearing 41 is disposed radially side by side with the first tapered roller bearing 63, with the projection 522 located between the first ball bearing 41 and the first tapered roller bearing 63. At least a portion of the first ball bearing 41 is disposed radially inward of the first tapered roller bearing 63. The clutch device 4 is thus reduced in axial size. Although an entirety of the first ball bearing 41 is disposed inward of the first tapered roller bearing 63 in the present embodiment, the first ball bearing 41 may be disposed in any other suitable manner. The first ball bearing 41 is preferably at least partially disposed inward of the first tapered roller bearing 63. In other words, the first tapered roller bearing 63 and the first ball bearing 41 preferably at least partially overlap with each other in the axial direction.

Figure 3B:
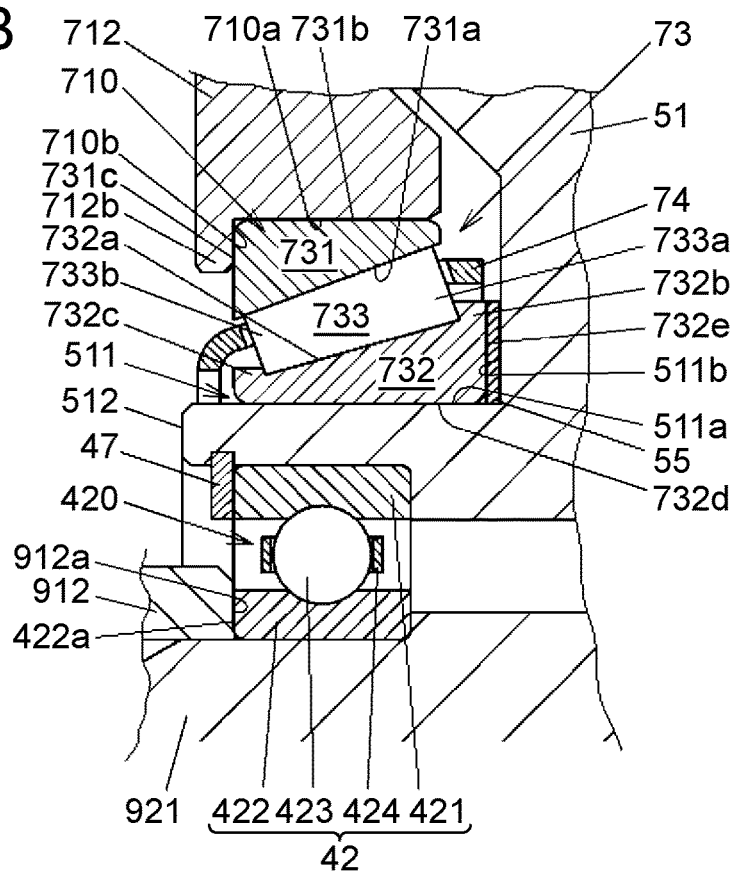
FIG. 3B is an enlarged cross-sectional view of a portion of FIG. 2 adjacent to a second tapered roller bearing.

FIG. 3B is an enlarged cross-sectional view of a portion of FIG. 2 adjacent to the second tapered roller bearing 73. A wall 712 of the second clutch housing 71 is provided with an outer ring attachment portion 710. An outer ring 731 of the second tapered roller bearing 73 is attached to the outer ring attachment portion 710. The first case member 51 of the clutch case 5 is provided with an inner ring attachment portion 511. An inner ring 732 of the second tapered roller bearing 73 is attached to the inner ring attachment portion 511. Each tapered roller 733 includes a large diameter portion 733a and a small diameter portion 733b and thus has a conical shape. The inner peripheral surface of the outer ring 731 is provided with an outer ring raceway surface 731a. The outer peripheral surface of the inner ring 732 is provided with an inner ring raceway surface 732a. The tapered rollers 733 roll on the outer ring raceway surface 731a and the inner ring raceway surface 732a. The inner ring 732 includes a bottom face rib 732b (hereinafter referred to as a "large rib 732b") and a top face rib 732c (hereinafter referred to as a "small rib 732c"). The large rib 732b and the small rib 732c prevent axial movement of the tapered rollers 733.

The outer ring attachment portion 710 is a recess defined in an inner diameter end of the wall 712. The outer ring attachment portion 710 includes an outer periphery receiving surface 710a and a lateral receiving surface 710b. The outer periphery receiving surface 710a is in contact with an outer peripheral surface 731b of the outer ring 731. The lateral receiving surface 710b is in contact with an axial end face 731c of the outer ring 731 located on its first axial side (i.e., adjacent to the small rib 732c of the inner ring 732). The lateral receiving surface 710b is provided in the form of a lateral surface of a protrusion 712b of the wall 712. The protrusion 712b protrudes radially inward from the outer periphery receiving surface 710a.

The first case member 51 is provided with a cylindrical projection 512. The inner ring attachment portion 511 is provided on the outer periphery of the projection 512. The inner ring attachment portion 511 includes an inner periphery receiving surface 511a and a lateral receiving surface 511b. The inner periphery receiving surface 511a is in contact with an inner peripheral surface 732d of the inner ring 732. A shim 55 is located between the lateral receiving surface 511b and an axial end face 732e of the inner ring 732 adjacent to the large rib 732b. The inner periphery receiving surface 511a is provided in the form of an outer peripheral surface of the projection 512.

The second ball bearing 42 includes an outer ring 421, an inner ring 422, a plurality of rolling elements 423, and a cage 424. The rolling elements 423 are spherical and disposed in a bearing inner space 420 defined between the outer ring 421 and the inner ring 422. The cage 424 holds the rolling elements 423. The outer ring 421 is retained by a snap ring 47 fitted to the inner peripheral surface of the projection 512. The inner ring 422 includes a lateral surface 422a. The lateral surface 422a of the inner ring 422 is in contact with an axial end face 912a of the inner cylindrical portion 912 of the second clutch hub 91.

The second ball bearing 42 is disposed radially side by side with the second tapered roller bearing 73, with the projection 512 located between the second ball bearing 42 and the second tapered roller bearing 73. At least a portion of the second ball bearing 42 is disposed radially inward of the second tapered roller bearing 73. The second tapered roller bearing 73 and the second ball bearing 42 at least partially overlap with each other in the axial direction. In the present embodiment, an entirety of the second ball bearing 42 is disposed inward of the second tapered roller bearing 73.

The tapered rollers 633 of the first tapered roller bearing 63 are disposed such that the large diameter portion 633a of each tapered roller 633 is located axially farther away from the housing space 61a of the first clutch housing 61 than the small diameter portion 633b of each tapered roller 633 (i.e., such that the large diameter portion 633a of each tapered roller 633 is located closer to the second case member 52 than the small diameter portion 633b of each tapered roller 633). The bore diameter of the outer ring 631 of the first tapered roller bearing 63, defined by the outer ring raceway surface 631a, increases as the outer ring 631 extends axially away from the housing space 61a. The outside diameter of the inner ring 632 of the first tapered roller bearing 63, defined by the inner ring raceway surface 632a, increases as the inner ring 632 extends axially away from the housing space 61a. This provides higher rigidity to the first tapered roller bearing 63 that receives the pressing force of the second presser 74.

The tapered rollers 733 of the second tapered roller bearing 73 are disposed such that the large diameter portion 733a of each tapered roller 733 is located axially farther away from the housing space 71a of the second clutch housing 71 than the small diameter portion 733b of each tapered roller 733 (i.e., such that the large diameter portion 733a of each tapered roller 733 is located closer to the first case member 51 than the small diameter portion 733b of each tapered roller 733). The bore diameter of the outer ring 731 of the second tapered roller bearing 73, defined by the outer ring raceway surface 731a, increases as the outer ring 731 extends axially away from the housing space 71a. The outside diameter of the inner ring 732 of the second tapered roller bearing 73, defined by the inner ring raceway surface 732a, increases as the inner ring 732 extends axially away from the housing space 71a. This provides higher rigidity to the second tapered roller bearing 73 that receives the pressing force of the first presser 64.

The shims 54 and 55 adjust pre-loads applied from the first and second tapered roller bearings 63 and 73 to a rotator made up of the first and second clutch housings 61 and 71 and the partition 43. The thicknesses of the shims 54 and 55 are determined in accordance with the results of measurement of a distance between the lateral receiving surface 610b of the first clutch housing 61 and the lateral receiving surface 710b of the second clutch housing 71 or a distance between the lateral receiving surface 511b of the first case member 51 and the lateral receiving surface 521b of the second case member 52.

The following description discusses a lubricating structure to supply lubricating oil to, for example, the first and second ball bearings 41 and 42, the first and second tapered roller bearings 63 and 73, the ball bearings 341 and 342, and the first and second multi-disc clutches 62 and 72 housed in the clutch case 5.

Figure 4:
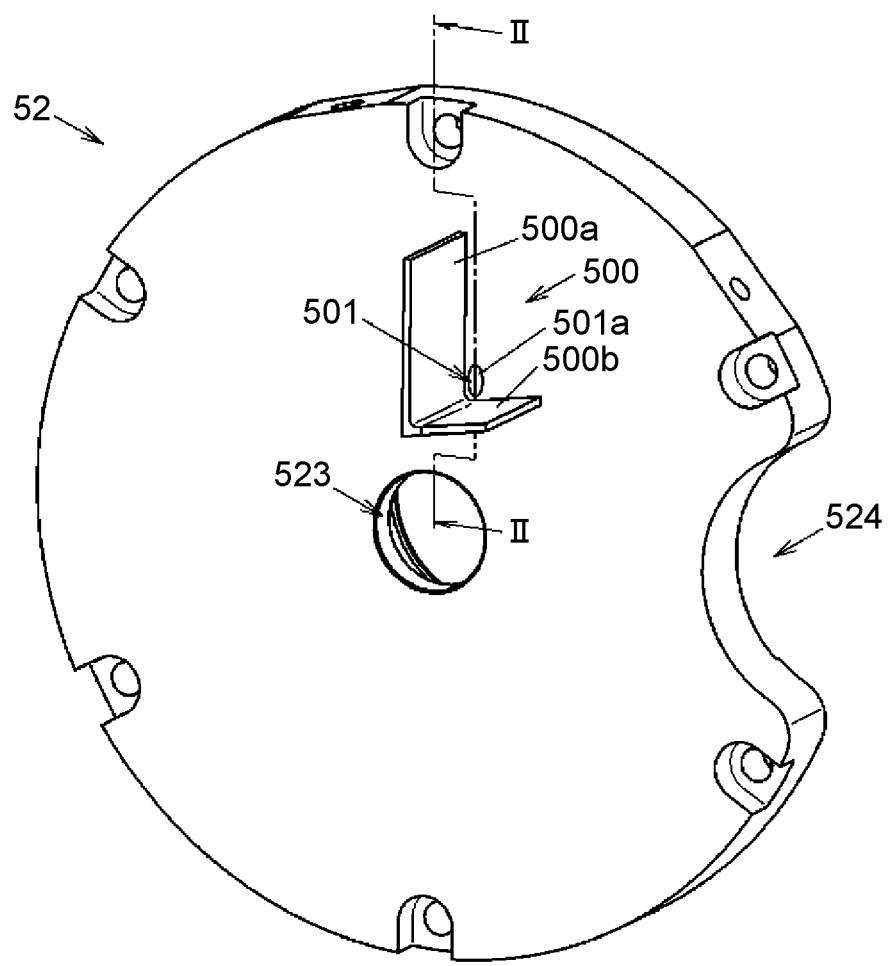
FIG. 4 is a perspective view of a second case as viewed from a driver.

FIG. 4 is a perspective view of the second case member 52 as viewed from the driver 2. A downward direction in FIG. 4 corresponds to a vertically downward direction, with the vehicle driving apparatus 1 installed on the vehicle. FIG. 2 illustrates a cross-section of the second case member 52 taken along the line II-II in FIG. 4.

The second case member 52 is provided with a first oil receiver 500 to receive lubricating oil pushed up by rotation of the disk 321 of the reduction gear 32. The first oil receiver 500 includes a first plate 500a and a second plate 500b. The first oil receiver 500 is disposed vertically above an insertion hole 523 through which the body 821 of the first output shaft 82 is inserted. The second case member 52 is provided with a cut-out 524 to prevent the second case member 52 from interfering with the hollow shaft 322 of the reduction gear 32.

The first plate 500a extends vertically. The second plate 500b extends from the lower end of the first plate 500a such that an acute angle is formed between the first plate 500a and the second plate 500b. The first plate 500a receives lubricating oil scattered from the large diameter gear 321a of the disk 321. The second plate 500b prevents the lubricating oil from flowing down to the insertion hole 523.

The first oil receiver 500 is in communication with the first oil passage 501 defined in the second case member 52. As illustrated in FIGS. 2 and 3A, the first oil passage 501 passes through the second case member 52 between the driver 2 and the first clutch 6. The first oil passage 501 includes an inlet 501a and an outlet 501b. The inlet 501a is an opening in communication with the first oil receiver 500. The outlet 501b is an opening defined in an inner portion of the projection 522 facing the first ball bearing 41.

The lubricating oil received by the first oil receiver 500 flows into the first oil passage 501 through the inlet 501a and then flows out of the outlet 501b owing to gravity. The lubricating oil that has flowed out of the outlet 501b is supplied to the first ball bearing 41 so as to lubricate the first ball bearing 41. The lubricating oil supplied to the first ball bearing 41 passes through the bearing inner space 410 of the first ball bearing 41 and is then introduced into the introduction space 810. A portion of the lubricating oil introduced into the introduction space 810 is supplied through the oil holes 811b to the first multi-disc clutch 62. A portion of the lubricating oil that has passed through the bearing inner space 410 of the first ball bearing 41 flows beyond the projection 522 owing to centrifugal force and/or gravity and is thus supplied to the first tapered roller bearing 63. The lubricating oil that has passed between the outer ring 631 and the inner ring 632 of the first tapered roller bearing 63 is supplied to the thrust roller bearing 66 owing to centrifugal force.

FIG. 5A is a perspective view of the first case member 51 as viewed from the driver 2. FIG. 5B is a perspective view of the first case member 51 as viewed from a position opposite to the driver 2.

The first case member 51 includes a first housing portion 51a and a second housing portion 51b. The first and second clutches 6 and 7 are housed in the first housing portion 51a. The hollow shaft 322 of the reduction gear 32 is housed in the second housing portion 51b. The inner peripheral surface of the first housing portion 51a of the first case member 51 is provided with a second oil receiver 502 and a third oil receiver 503. The second and third oil receivers 502 and 503 receive lubricating oil pushed up by the gear 33a of the ring gear 33. The second and third oil receivers 502 and 503 are grooves extending axially parallel to each other. The second oil passage 504 and the third oil passage 505 are defined in the first case member 51. The second oil passage 504 is in communication with the second oil receiver 502. The third oil passage 505 is in communication with the third oil receiver 503.

The lubricating oil received by the second oil receiver 502 is supplied to an inner portion of the projection 512 through the second oil passage 504. The second oil passage 504 includes an inlet 504a and an outlet 504b. The inlet 504a is an opening in communication with the second oil receiver 502. The outlet 504b is an opening defined in the inner portion of the projection 512 facing the second ball bearing 42 (see FIG. 1). The lubricating oil received by the second oil receiver 502 flows into the second oil passage 504 through the inlet 504a and then flows out of the outlet 504b.

The lubricating oil that has flowed out of the outlet 504b is supplied to the second ball bearing 42 so as to lubricate the second ball bearing 42. The lubricating oil supplied to the second ball bearing 42 passes through the bearing inner space 420 of the second ball bearing 42 and is then introduced into the introduction space 910. A portion of the lubricating oil introduced into the introduction space 910 is supplied through the oil holes 911b to the second multi-disc clutch 72. A portion of the lubricating oil that has passed through the bearing inner space 420 of the second ball bearing 42 flows beyond the projection 512 owing to centrifugal force and/or gravity and is thus supplied to the second tapered roller bearing 73. The lubricating oil that has passed between the outer ring 731 and the inner ring 732 of the second tapered roller bearing 73 is supplied to the thrust roller bearing 76 owing to centrifugal force.

The lubricating oil received by the third oil receiver 503 is supplied into the axial hole 320 of the reduction gear 32 through the third oil passage 505. The lubricating oil supplied into the axial hole 320 is then supplied to the ball bearing 341 through the clearance 401 and supplied to the ball bearing 342 through the clearance 402.

As illustrated in FIG. 5B, a portion of the first case member 51 where the second oil passage 504 is defined is provided with a bulge 513, and a portion of the first case member 51 where the third oil passage 505 is defined is provided with a bulge 514. The first case member 51 is provided with a joint 515 and a joint 516. The joint 515 is connected with a pipe through which hydraulic oil is supplied to the cylinder 510. The joint 516 is connected with a pipe through which hydraulic oil is supplied to the cylinder 520.

The outlet 504b of the second oil passage 504 is an opening located at a position vertically lower than the inlet 504a of the second oil passage 504. An outlet 505b of the third oil passage 505 is an opening located at a position vertically lower than an inlet 505a of the third oil passage 505. The lubricating oil thus smoothly flows through the second and third oil passages 504 and 505 owing to gravity.

Functions and Effects of the Embodiment

The embodiment described above involves supporting the wall 612 of the first clutch housing 61 by the outer ring 631 of the first tapered roller bearing 63, and supporting the wall 712 of the second clutch housing 71 by the outer ring 731 of the second tapered roller bearing 73. Thus, the radial length of each of the walls 612 and 712 is shorter than, for example, the radial length of a wall supported by an inner ring of a bearing of a conventional clutch device. Consequently, it is possible to reduce the area (or size) of the walls 612 and 712 as viewed in the axial direction, and such a reduction in the radial length makes it possible to increase rigidity of the walls 612 and 712. This enables a reduction in thickness of each of the walls 612 and 712. Consequently, the resulting clutch device 4 will be smaller and lighter.

The first tapered roller bearing 63 is configured such that the large diameter portion 633a of each tapered roller 633 is disposed axially farther away from the housing space 61a than the small diameter portion 633b of each tapered roller 633, and the second tapered roller bearing 73 is configured such that the large diameter portion 733a of each tapered roller 733 is disposed axially farther away from the housing space 71a than the small diameter portion 733b of each tapered roller 733. This provides sufficient rigidity to the first and second tapered roller bearings 63 and 73 that respectively support the first and second clutch housings 61 and 71. The lubricating oil supplied to the first tapered roller bearing 63 flows axially from between the outer ring 631 and the inner ring 632 owing to centrifugal force and is then smoothly supplied to the thrust roller bearing 66. The lubricating oil supplied to the second tapered roller bearing 73 flows axially from between the outer ring 731 and the inner ring 732 owing to centrifugal force and is then smoothly supplied to the thrust roller bearing 76.

The first ball bearing 41 that supports the first inner rotative member 8 is disposed inward of the first tapered roller bearing 63, and the second ball bearing 42 that supports the second inner rotative member 9 is disposed inward of the second tapered roller bearing 73. This enables a further reduction in the size of the clutch device 4. The bearing inner space 410 of the first ball bearing 41 and the bearing inner space 420 of the second ball bearing 42 are thus used as lubricating oil passages so as to smoothly supply the lubricating oil to the first and second tapered roller bearings 63 and 73.

The lubricating oil introduced into the introduction space 810 through the bearing inner space 410 of the first ball bearing 41 is supplied to the first multi-disc clutch 62, and the lubricating oil introduced into the introduction space 910 through the bearing inner space 420 of the second ball bearing 42 is supplied to the second multi-disc clutch 72. This makes it possible to lubricate frictional sliding faces of the outer clutch plates 621 and the inner clutch plates 622 of the first multi-disc clutch 62 without using, for example, any dedicated component to supply lubricating oil to the first multi-disc clutch 62 and to facilitate frictional sliding of the outer clutch plates 721 and the inner clutch plates 722 of the second multi-disc clutch 72 without using, for example, any dedicated component to supply lubricating oil to the second multi-disc clutch 72.

First Modification

Referring to FIGS. 6A to 6D, a first modification of the above embodiment will be described below.

Figure 6A:
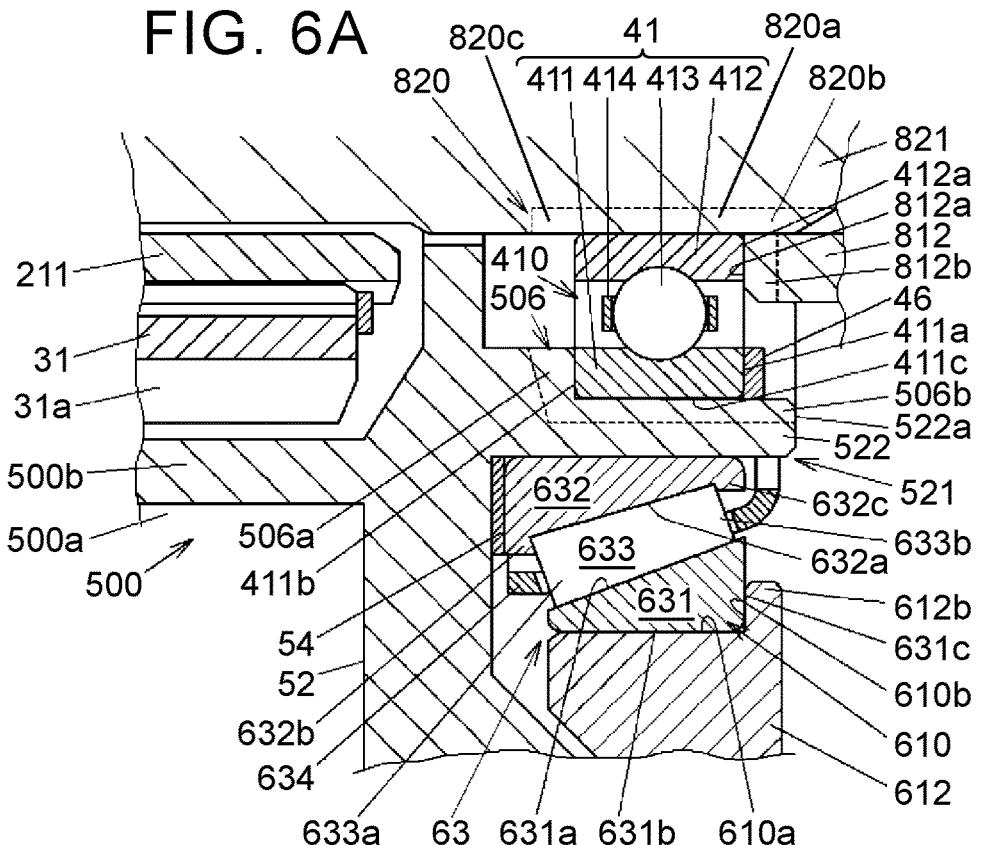
FIG. 6A is a cross-sectional view of a portion of a vehicle driving apparatus according to a first modification.
Figure 6B:
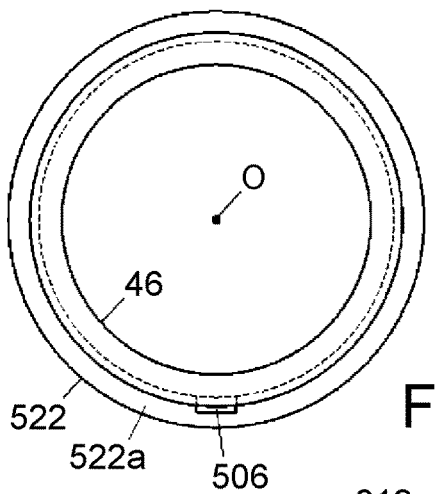
FIG. 6B is a schematic diagram illustrating exemplary shapes of a projection and a snap ring adjacent to an inner ring attachment portion according to the first modification as viewed in an axial direction.
Figure 6C:
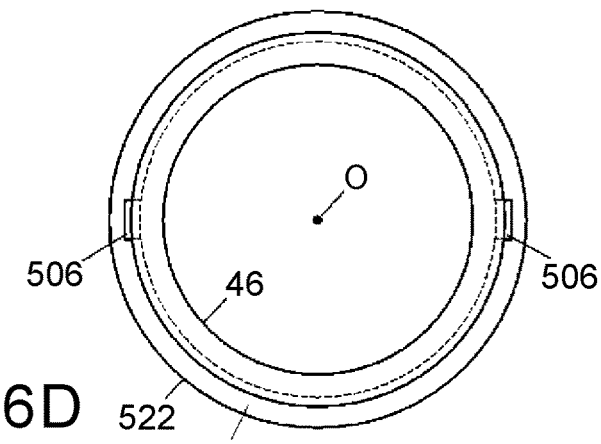
FIG. 6C is a schematic diagram illustrating another exemplary shapes of the projection and the snap ring adjacent to the inner ring attachment portion according to the first modification as viewed in the axial direction.
Figure 6D:
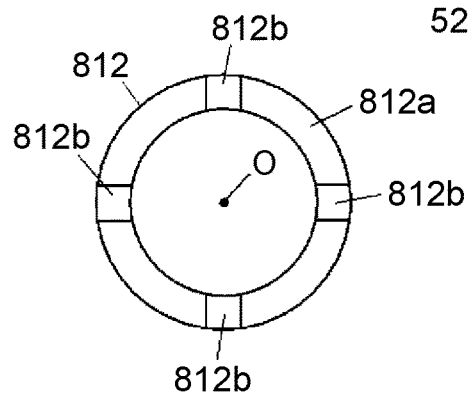
FIG. 6D is a schematic diagram illustrating an exemplary shape of an inner cylindrical portion according to the first modification as viewed in the axial direction.

FIG. 6A is a cross-sectional view of a portion of the vehicle driving apparatus 1 according to the first modification. FIG. 6B is a schematic diagram illustrating exemplary shapes of the projection 522 and the snap ring 46 adjacent to the inner ring attachment portion 521 according to the first modification as viewed in the axial direction. FIG. 6C is a schematic diagram illustrating another exemplary shapes of the projection 522 and the snap ring 46 adjacent to the inner ring attachment portion 521 according to the first modification as viewed in the axial direction. FIG. 6D is a schematic diagram illustrating an exemplary shape of the inner cylindrical portion 812 according to the first modification as viewed in the axial direction. A downward direction in each of FIGS. 6A to 6D corresponds to a vertically downward direction, with the vehicle driving apparatus 1 installed on the vehicle.

The first modification involves providing an oil passage 506 and an oil passage 820 (which function as lubricating oil flow paths) in addition to the bearing inner space 410 of the first ball bearing 41. The oil passage 506 is located radially outward of the first ball bearing 41. The oil passage 820 is located radially inward of the first ball bearing 41. The oil passage 506 is a groove defined in a portion of the inner peripheral surface of the projection 522 located radially outward of the first ball bearing 41. The oil passage 820 is a groove defined in a portion of the outer peripheral surface of the body 821 of the first output shaft 82 located radially inward of the first ball bearing 41. The oil passage 506 and the oil passage 820 will be described in detail below.

The oil passage 506 is a groove defined in the inner peripheral surface of the projection 522. The oil passage 506 includes a first groove 506*a* and a second groove 506*b*. The outer ring 411 includes a lateral surface 411*a*, a lateral surface 411*b*, and an outer peripheral surface 411*c*. The lateral surface 411*a* is in abutment with the snap ring 46. The lateral surface 411*b* is located opposite to the lateral surface 411*a*. The first groove 506*a* extends in the radial direction of the projection 522 along the lateral surface 411*b* of the outer ring 411. The second groove 506*b* axially extends along the outer peripheral surface 411*c* of the outer ring 411. A first end of the second groove 506*b* is in communication with the first groove 506*a*. A second end of the second groove 506*b* is an opening defined in an axial end face 522*a* of the projection 522 located adjacent to the introduction space 810.

The oil passage 506 is provided at one circumferential location on the projection 522 or a plurality of the oil passages 506 is provided at two or more circumferential locations on the projection 522. FIG. 6B illustrates an example where the oil passage 506 is provided at one location on the projection 522. An entirety of the oil passage 506 illustrated in FIG. 6B is disposed below the rotation axis O. More specifically, the oil passage 506 is defined in a low end portion of the projection 522 in a vertical direction. FIG. 6C illustrates an example where the oil passages 506 are provided at two locations on the projection 522. The oil passages 506 illustrated in FIG. 6C are disposed such that the rotation axis O is located between the oil passages 506 and a portion of each oil passage 506 is located below the rotation axis O.

The oil passage 820 is a groove defined in the outer peripheral surface of the body 821 of the first output shaft 82. The oil passage 820 includes a first region 820*a*, a second region 820*b*, and a third region 820*c*. The first region 820*a* is located inward of the inner ring 412. The second region 820*b* is located inward of the inner cylindrical portion 812. The third region 820*c* extends from the first region 820*a* in a direction opposite to the second region 820*b*. The oil passage 820 thus extends axially.

The inner cylindrical portion 812 is provided with a cut-out 812*b* axially recessed from the axial end face 812*a* in abutment with the lateral surface 412*a* of the inner ring 412. The cut-out 812*b* is in communication with the second region 820*b* of the oil passage 820. The inner cylindrical portion 812 does not necessarily have to be provided with the cut-out 812*b* when the axial end face 812*a* of the inner cylindrical portion 812 and the lateral surface 412*a* of the inner ring 412 have a slight clearance therebetween.

A plurality of the oil passages 820 is provided at circumferential locations on the body 821 of the first output shaft 82. A plurality of the cut-outs 812*b* is provided at circumferential locations on the inner cylindrical portion 812. In FIG. 6A, one of the oil passages 820 and one of the cut-outs 812*b* are indicated by the dashed lines. FIG. 6D illustrates an example where the inner cylindrical portion 812 is provided with four cut-outs 812*b* located at regular circumferential intervals.

The first modification described above enables the lubricating oil that has flowed out of the outlet 501*b* of the first oil passage 501 to be supplied to the first tapered roller bearing 63 not only through the bearing inner space 410 of the first ball bearing 41 but also through the oil passage(s) 506 radially outward of the first ball bearing 41 and the oil passage(s) 820 radially inward of the first ball bearing 41.

Second Modification

Figure 7A:
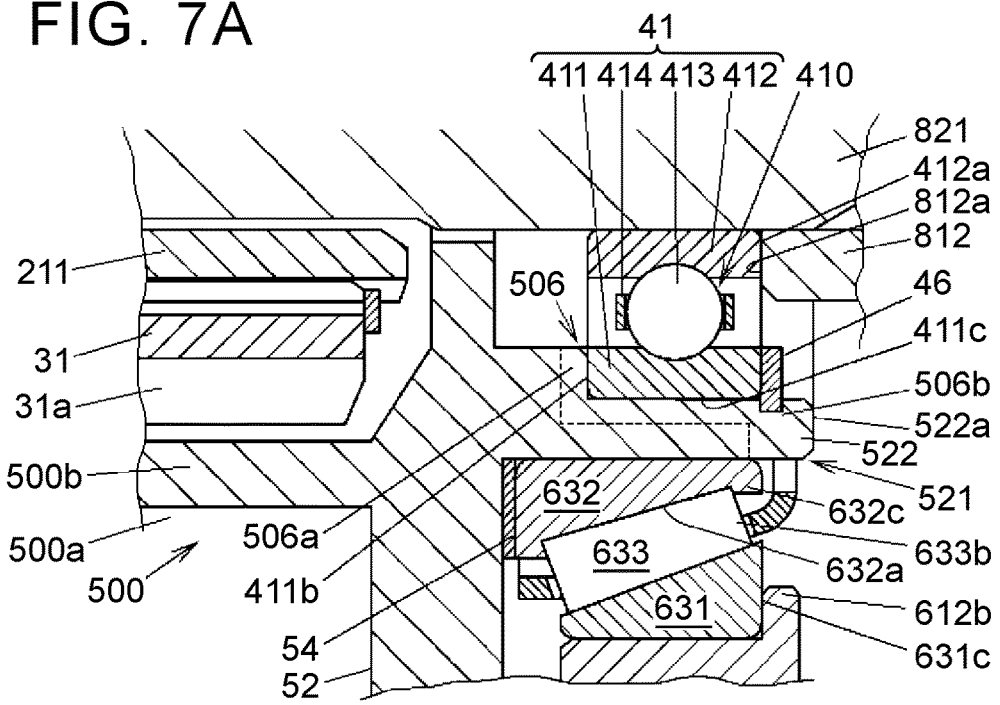
FIG. 7A is a cross-sectional view of a portion of a vehicle driving apparatus according to a second modification.
Figure 7B:
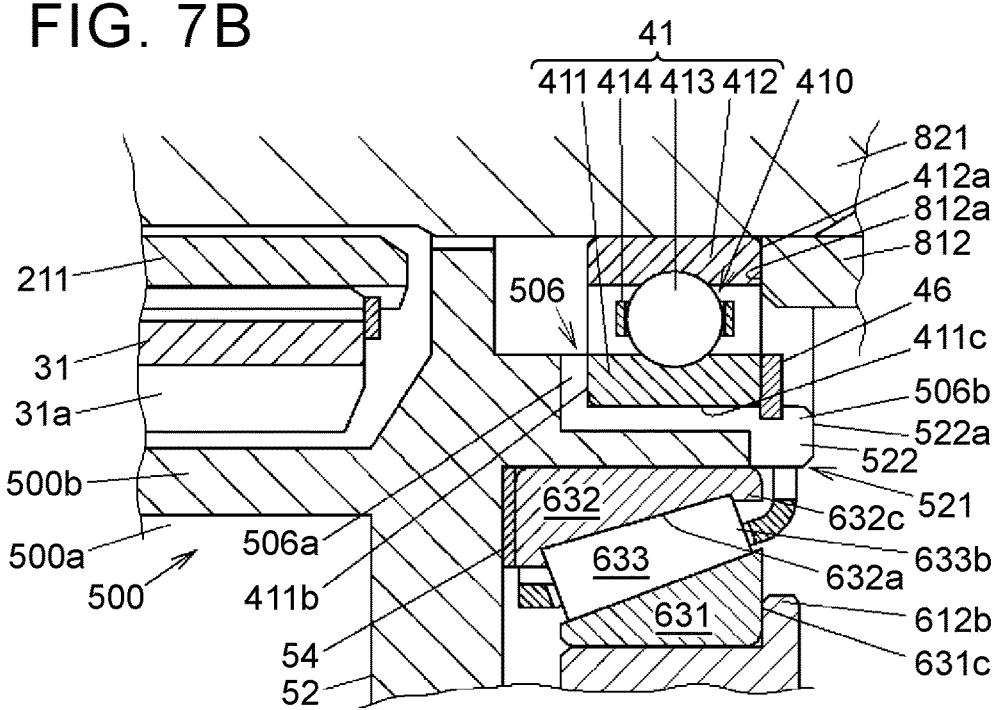
FIG. 7B is a cross-sectional view of a portion of the vehicle driving apparatus according to the second modification as viewed in cross section different from that of FIG. 7A.
Figure 7C:
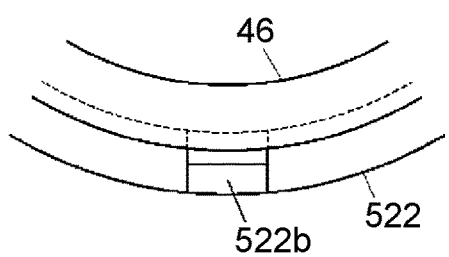
FIG. 7C is a schematic diagram illustrating exemplary shapes of portions of a projection and a snap ring (which are illustrated in FIG. 7B) as viewed in the axial direction.

Referring to FIGS. 7A to 7C, a second modification of the above embodiment will be described below.

FIG. 7A is a cross-sectional view of a portion of the vehicle driving apparatus 1 according to the second modification. FIG. 7B is a cross-sectional view of a portion of the vehicle driving apparatus 1 according to the second modification as viewed in cross section different from that of FIG. 7A. FIG. 7C is a schematic diagram illustrating exemplary shapes of portions of the projection 522 and the snap ring 46 (which are illustrated in FIG. 7B) as viewed in the axial direction. Components illustrated in FIGS. 7A to 7C and corresponding to those illustrated in FIGS. 6A to 6D are identified by the same reference signs as those used in FIGS. 6A to 6D, and description thereof will be omitted when redundant. A downward direction in each of FIGS. 7B and 7C corresponds to a vertically downward direction, with the vehicle driving apparatus 1 installed on the vehicle.

The second modification involves modifying the oil passage 506 according to the first modification. Specifically, although the second groove 506*b* of the oil passage 506 is defined only in the inner peripheral surface of the projection 522 in the first modification, the second modification involves defining the second groove 506*b* such that a portion of the second groove 506*b* adjacent to the axial end face 522*a* reaches the outer peripheral surface of the projection 522. At least a portion of the second groove 506*b* located outward of the snap ring 46 is an opening defined in the outer peripheral surface of the projection 522.

A portion of the oil passage 506 adjacent to the snap ring 46 will thus not be narrowed, enabling the lubricating oil to more smoothly flow to the introduction space 810.

Additional Notes

The embodiment of the present disclosure and the modifications thereof have been described thus far. The embodiment of the present disclosure and the modifications thereof, however, do not limit the applicable embodiment defined by the claims. It should be noted that all combinations of the features described in the above embodiment and modifications are not necessarily essential to the solutions of the present disclosure.

Any suitable changes may be made to the present disclosure without departing from the spirit and scope of the present disclosure. Although the above embodiment and modifications have been described on the assumption that the clutch device 4 is used in the vehicle driving apparatus 1, the present disclosure does not necessarily have to be applied to the clutch device 4 for the vehicle driving apparatus 1 but may be applied to clutch devices for various uses.

What is claimed is:

1. A clutch device comprising:
   a case;
   a clutch housing housed in the case, the clutch housing including a cylindrical portion and a wall, the cylindrical portion including a housing space defined inside the cylindrical portion, the wall extending radially inward from an end of the cylindrical portion;
   a multi-disc clutch housed in the housing space, the multi-disc clutch including a plurality of clutch plates;
   a rolling bearing including an inner ring, an outer ring, and a plurality of rolling elements disposed between the inner ring and the outer ring, the inner ring being attached to an inner ring attachment portion of the case, the outer ring being attached to an outer ring attachment portion of the wall of the clutch housing, the rolling bearing being configured to support the clutch housing such that the clutch housing is rotatable relative to the case;
an inner rotative member disposed inward of the clutch housing;
a support member to support the inner rotative member such that the inner rotative member rotates relative to the case; and
a lubricating structure configured to supply lubricating oil to the rolling bearing supporting the clutch housing, wherein
the support member includes a second rolling bearing including a second inner ring, a second outer ring, and a plurality of second rolling elements disposed in a bearing inner space defined between the second inner ring and the second outer ring,
the lubricating structure is configured to supply the lubricating oil having passed through the bearing inner space, and
the inner rotative member includes
an engagement portion in engagement with inner clutch plates of the plurality of clutch plates,
an introduction space into which the lubricating oil having passed through the support member is introduced, the introduction space being located inward of the engagement portion, and
an oil hole through which the introduction space is in communication with the housing space.

2. The clutch device according to claim 1, further comprising an inner rotative member disposed inward of the clutch housing, wherein
the rolling bearing is a tapered roller bearing in which the rolling elements each include a large diameter portion and a small diameter portion such that each of the rolling elements has a conical shape, and the rolling elements roll on an outer ring raceway surface of an inner peripheral surface of the outer ring and an inner ring raceway surface of an outer peripheral surface of the inner ring, and
the large diameter portion of each of the rolling elements is disposed farther away from the housing space than the small diameter portion of each of the rolling elements in an axial direction parallel to a rotation axis of the inner rotative member.

3. The clutch device according to claim 1, wherein
the multi-disc clutch includes
a plurality of outer clutch plates in engagement with the cylindrical portion of the clutch housing such that the outer clutch plates are non-rotatable relative to the cylindrical portion, and
a plurality of inner clutch plates in engagement with the inner rotative member such that the inner clutch plates are non-rotatable relative to the inner rotative member, and
the support member is disposed radially inward of the inner ring of the rolling bearing.

4. The clutch device according to claim 3, wherein
the inner rotative member includes a groove defined in a portion of an outer peripheral surface of the inner rotative member located radially inward of the support member, the groove being configured to allow the lubricating oil to flow through the groove, and
the lubricating structure is configured such that the lubricating oil having flowed through the groove is supplied to the rolling bearing supporting the clutch housing.

5. The clutch device according to claim 3, further comprising a lubricating structure configured to supply the lubricating oil to the rolling bearing supporting the clutch housing, wherein
the inner ring of the rolling bearing supporting the clutch housing is disposed on an outer periphery of a projection of the case,
the projection includes a groove defined in a portion of an inner peripheral surface of the projection located radially outward of the support member, the groove being configured to allow the lubricating oil to flow through the groove, and
the lubricating structure is configured such that the lubricating oil having flowed through the groove is supplied to the rolling bearing supporting the clutch housing.

6. The clutch device according to claim 5, wherein
the support member is prevented from moving to one side in an axial direction parallel to a rotation axis of the inner rotative member by a snap ring fitted to the projection, and
at least a portion of the groove of the projection located outward of the snap ring reaches an outer peripheral surface of the projection.

7. The clutch device according to claim 3, wherein
the lubricating structure is configured such that the lubricating oil introduced into the introduction space is supplied to the multi-disc clutch through the oil hole.

8. A clutch device comprising:
a case;
a first clutch housing housed in the case, the first clutch housing including a cylindrical portion and a wall extending inward from an end of the cylindrical portion;
a second clutch housing housed in the case, the second clutch housing including a cylindrical portion and a wall extending inward from an end of the cylindrical portion;
a first multi-disc clutch housed in a first housing space defined inward of the cylindrical portion of the first clutch housing, the first multi-disc clutch including a plurality of clutch plates;
a second multi-disc clutch housed in a second housing space defined inward of the cylindrical portion of the second clutch housing, the second multi-disc clutch including a plurality of clutch plates;
a partition defining a boundary between the first housing space and the second housing space;
a first rolling bearing supporting the first clutch housing such that the first clutch housing is rotatable relative to the case, the first rolling bearing including an inner ring, an outer ring, and a plurality of rolling elements disposed between the inner ring and the outer ring, the inner ring of the first rolling bearing being attached to a first inner ring attachment portion of the case, the outer ring of the first rolling bearing being attached to a first outer ring attachment portion of the wall of the first clutch housing;
a second rolling bearing supporting the second clutch housing such that the second clutch housing is rotatable relative to the case, the second rolling bearing including an inner ring, an outer ring, and a plurality of rolling elements disposed in a bearing inner space defined between the inner ring and the outer ring, the inner ring of the second rolling bearing being attached to a second inner ring attachment portion of the case, the outer ring of the second rolling bearing being attached to a second outer ring attachment portion of the wall of the second clutch housing;
an inner rotative member disposed inward of the first clutch housing;
a support member to support the inner rotative member such that the inner rotative member rotates relative to the case; and
a lubricating structure configured to supply lubricating oil to the first rolling bearing supporting the first clutch housing, wherein
the lubricating structure is configured to supply the lubricating oil having passed through the bearing inner space, wherein
the inner rotative member includes
an engagement portion in engagement with inner clutch plates of the first multi-disc clutch,
an introduction space into which lubricating oil having passed through the support member is introduced, the introduction space being located inward of the engagement portion, and
an oil hole through which the introduction space is in communication with the first housing space.

9. The clutch device according to claim 8, further comprising:

a first presser;
a second presser;
a first inner rotative member disposed inward of the first clutch housing; and
a second inner rotative member disposed inward of the second clutch housing, wherein
the wall of the first clutch housing and the wall of the second clutch housing are each provided with a through hole extending in an axial direction parallel to a rotation axis of the first and second inner rotative members,
the first presser includes a pressing portion inserted through the through hole of the wall of the first clutch housing, the first presser being configured to press the first multi-disc clutch to the partition, and
the second presser includes a pressing portion inserted through the through hole of the wall of the second clutch housing, the second presser being configured to press the second multi-disc clutch to the partition.

10. The clutch device according to claim 9, wherein
the partition is secured to the first clutch housing and the second clutch housing such that the partition is immovable relative to the first and second clutch housings in the axial direction.

* * * * *